(12) United States Patent  
Hawver et al.

(10) Patent No.: US 7,679,062 B2  
(45) Date of Patent: Mar. 16, 2010

(54) POWER SUPPLY FOR PORTABLE RADIOGRAPHIC DETECTOR

(75) Inventors: Jeffery Richard Hawver, Marion, NY (US); Ivan Petrov Mollov, Mountain View, CA (US)

(73) Assignees: Carestream Health, Inc.; Varian Medical Systems, Inc.

( * ) Notice: Subject to any disclaimer, the term of this patent is extended or adjusted under 35 U.S.C. 154(b) by 147 days.

(21) Appl. No.: 12/099,184

(22) Filed: Apr. 8, 2008

(65) Prior Publication Data

US 2009/0251125 A1  Oct. 8, 2009

(51) Int. Cl.
*H01L 27/146* (2006.01)
(52) U.S. Cl. .................................... 250/370.14
(58) Field of Classification Search ............ 250/370.09, 250/370.14
See application file for complete search history.

(56) References Cited

U.S. PATENT DOCUMENTS

| 4,034,232 | A | | 7/1977 | LaVenture |
| 5,077,771 | A | * | 12/1991 | Skillicorn et al. ............ 378/102 |
| 5,844,961 | A | | 12/1998 | McEvoy et al. |
| 7,015,478 | B2 | | 3/2006 | Yamamoto |
| 2005/0058252 | A1 | * | 3/2005 | Yamada ...................... 378/114 |
| 2006/0097180 | A1 | * | 5/2006 | Spartiotis et al. ....... 250/370.13 |

* cited by examiner

*Primary Examiner*—David P Porta
*Assistant Examiner*—Marcus H Taningco

(57) ABSTRACT

A digital radiography detector has a two-dimensional array of photosensors disposed in rows and columns. Multiple signal traces connect to the photosensors and extend in a first direction along the two-dimensional array. A switching power supply is connected to a power source and has first and second storage inductors that are substantially matched, are electrically connected in series, include flux fields that are opposite in phase, and are aligned along the first direction of the signal traces.

15 Claims, 15 Drawing Sheets

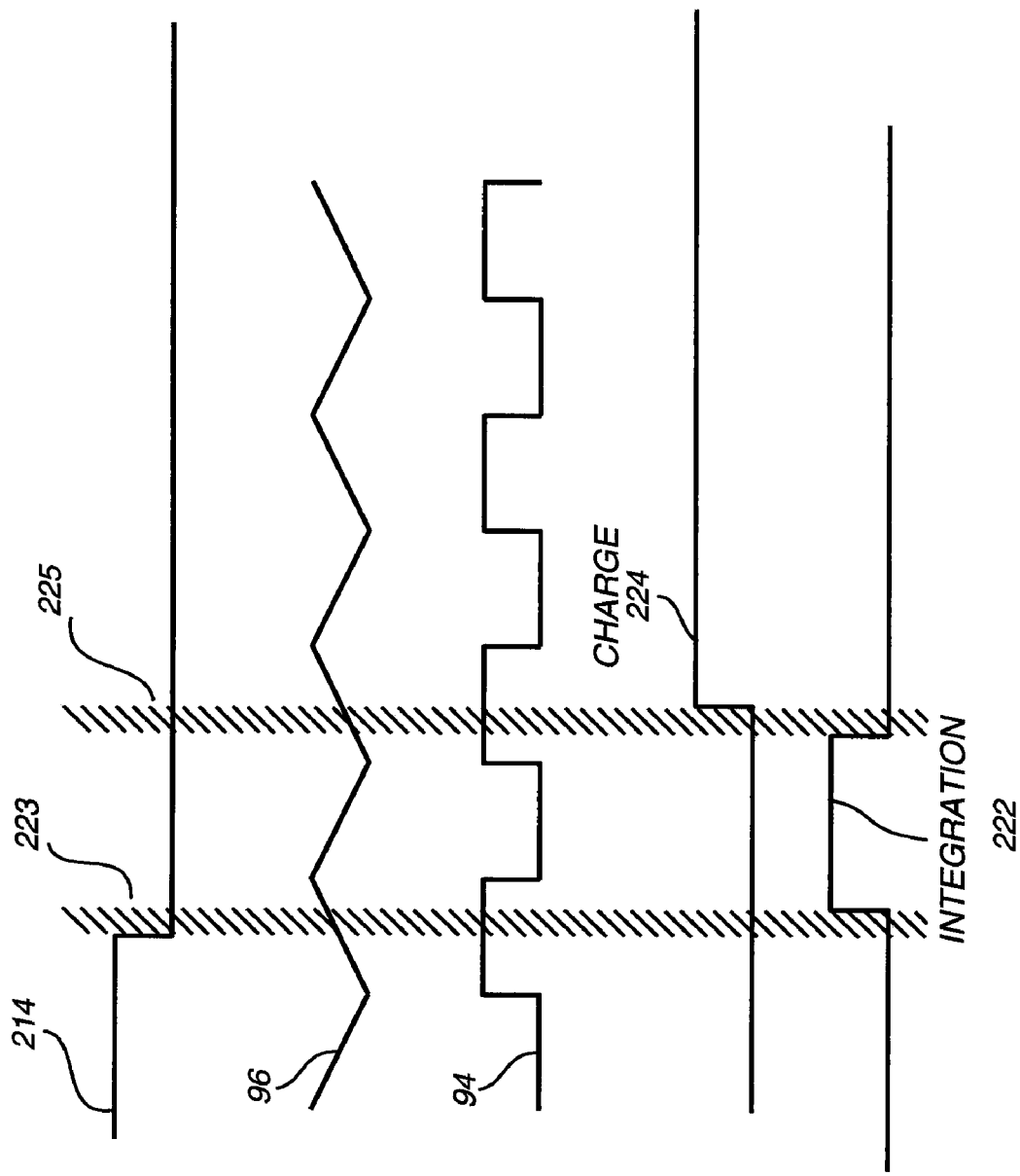

POWER SUPPLY FOR PORTABLE RADIOGRAPHIC DETECTOR

FIELD OF THE INVENTION

This invention generally relates to digital radiographic imaging systems and more particularly relates to a digital radiographic receiver having an on-board switching power supply.

BACKGROUND OF THE INVENTION

Portable battery-powered wireless capability is becoming an expected feature for many types of electronic sensing devices in general and for portable digital radiographic imaging detectors in particular. With medical imaging receiver equipment, portable, untethered operation offers some promise of improved patient care, with advantages including improved operator workflow and equipment adaptability.

Digital radiographic (DR) detectors, also known as flat panel detectors (FPDs) have revolutionized the field of general radiography by providing the capability to rapidly visualize and communicate X-ray images. Patient X-rays can be efficiently transmitted via data networks to one or more remote locations for analysis and diagnosis by radiologists without the delay incurred when sending physical films through the mail or via couriers to reach remotely located radiologists.

FIG. 1 shows a partial cutaway view of the basic imaging components of a conventional FPD. The FPD generally includes a large-area two-dimensional image sensor array 10 having many thousands of radiation-sensitive pixel sites 14 that are arranged in a matrix of rows and columns. Each pixel site 14 has one or more photosensors 12, such as a PIN photodiode, and one or more switch elements 16, such as thin film transistors (TFTs). As is generally understood, the photosensors convert X-ray radiation into signals that are read out by the switch elements 16 and stored in a memory associated with the detector. This conventional DR arrangement allows each radiation-sensitive pixel site 14 to be individually addressed and read out using conductive metalized rows and columns that extend across the length and width of the detector panel.

Radiation-sensitive pixel sites 14 of the FPD typically use photodiodes such as PIN photodiodes, but other photosensor technology can also be used. When photodiodes are used for radiographic image sensing, the X-ray radiation is first converted to a wavelength suitable to the photodiode at each radiation site. This is conventionally done using a scintillator screen 15 that, upon stimulation by X-ray radiation of one wavelength, emits photons in a second wavelength that is within the sensitivity of the photodiodes. Each photodiode then produces an electric charge that is proportionate to the number of photons it receives. The process of detecting X-ray radiation in this way, converting the detected radiation to digital information, and storing the digital information internally is herein termed image acquisition. Once the X-ray image has been acquired, it can be transmitted from the FPD to an operator console for image evaluation, downstream distribution, and/or long term storage.

In conventional, large-scale digital radiographic installations, the FPD is permanently installed at a predetermined location used for patient imaging. This type of installation is typically set up for obtaining a standardized set of radiological images that are routinely needed for a large number of patients. However, for situations where non-standard images are required, the patient is positioned relative to the stationary DR detector. For some patients, this creates a problem that is not easily resolved with digital radiography and can even necessitate return to the use of older technologies, such as the use of a phosphor computed radiography (CR) X-ray cassette. This can result in added cost and inefficiency and forces a medical facility to maintain older equipment to handle types of imaging not readily performed on the DR system.

The portable, cassette-type FPD provides an alternate solution to this positioning problem and allows for smaller and more portable x-ray imaging systems. A portable FPD enhances the efficiency of operator workflow since the detector can be readily positioned behind the patient, rather than requiring the patient to take an awkward position for imaging. In many cases, an FPD can replace the need for multiple detectors, since the same detector can be used both in a wall-mount position and a horizontal table position. The portable FPD has the flexibility to be easily and quickly moved to any suitable location throughout a DR suite and yet still provides immediate access to the acquired x-ray image.

Portable cassette-type detectors have been enabled by state of the art advances in both electrical components and packaging, allowing significant reduction in overall size and weight. A cassette-type FPD has been described, for example, in U.S. Pat. No. 5,844,961, which generally describes a filmless digital X-ray cassette having external dimensions approximately equal to those of a standard sized X-ray film or CR cassette. A combined communications and power link cable or tether serves both as a means to transfer digital image data from the FPD as well as to supply power to the flat panel device. An external AC to DC power supply also connects to the cassette through this combined communication and power link. The power supply, such as a battery, may alternatively be located inside the cassette to overcome the liability of needing a direct cable link for this purpose.

U.S. Pat. No. 7,015,478 entitled "X-ray Imaging Apparatus" (Yamamoto) describes a portable electronic cassette-type detector with an interconnecting cable that provides both communication and power. That patent describes attaching a second cable to the cassette, to connect and disconnect the device when positioning the detector under the patient. A battery and power supply can be located inside the detector housing.

Tethered solutions such as those presented in the McEvoy et al. and Yamamoto patents have inherent disadvantages. Connection of the interconnecting cables is made and maintained at each end, which can be difficult to achieve when moving the FPD around and behind some portion of the patient. The tether becomes a significant encumbrance when trying to optimally position a cassette-type FPD under a patient. The tether is also a potential source for damage to the sensing device because of the likelihood of inadvertently catching or tripping over the cable while moving the FPD to a new location. The tether also limits how far the detector can be from the console. Yet another problem relates to the need for multiple DC voltage levels for different portions of the sensing and processing circuitry. For these reasons, there can be particular difficulties in tethering DR imaging panels.

To effectively eliminate tethered power supplies, there is the need for portable on-board power that is compact, lightweight, and allows a runtime of several hours. High-energy lithium polymer batteries, typically with two or more cells connected in series, for example, may supply power sufficient for the complex communication, control and imaging circuitry on a portable FPD. A switch-mode power supply, (SMPS,) is a DC to DC converter that can use a battery source and is capable of producing output voltages that can be less than or greater than the voltage supplied by the battery. There are a number of types of DC to DC converter topologies typically used for SMPS devices and familiar to those skilled in the electronics art. Examples of a few of these topologies are buck, boost, SEPIC, CUK, flyback, and forward converters.

The SMPS operates by periodic switching of current into inductors and capacitors that serve as energy storage elements. Because their energy storage and switching components can be relatively small, SMPS devices are comparatively compact and lightweight. At the same time, SMPS devices are capable of power conversion efficiencies of up to 95 percent.

Although SMPSs offer these advantages, there can also be significant drawbacks. Among these drawbacks are inherently high noise levels when compared with linear power regulators and other power supply types. The noise generated from SMPS switching can be both conducted and radiated and can cause significant interference and image artifacts, degrading the performance of other nearby apparatuses, subsystems, or circuits, especially with regard to signal to noise ratio (SNR). This effect can be particularly pronounced for sensitive equipment such as that of a DR detector, with its high-impedance detector circuitry packaged in close proximity to inductors on the SMPS.

The main types of electromagnetic inductance (EMI) from switching power supplies are radiated electric and magnetic fields, generated in close proximity to switched components. A number of conventional solutions have been used for minimizing EMI effects with SMPSs. For conducted EMI modes, additional filter elements can be used, added in series along conduction paths that lie near power supply input and output lines. These filter elements typically include capacitors and series ferrite inductors that shunt or absorb the high frequency energy before it conducts to adjacent circuits.

Another method for reducing conducted EMI, often in conjunction with the use of noise filter elements, is to synchronize the switching frequency of one or more of the switch-mode power supplies to the master internal clock or other timing waveform that is already employed in an electronic device. For example, timing waveforms may trigger sensitive operations needed for sample-and-hold measurement, charge transfer, and small-signal analog-to-digital (A/D) conversion. When all switch-mode supplies for an apparatus are synchronized with or run on a common clock, filter implementation is simplified because the interference noise is constrained to one common frequency band. Using switch-mode supplies synchronized to a master system clock, the timing of transient noise from the switch-mode PWM waveform can be adjusted to prevent these transients from occurring during the sensitive device operations. As one example of a technique for timing synchronization, U.S. Pat. No. 4,034,232 describes a method of synchronizing multiple power supplies and positionally phase-shifting the individual clocks to minimize disruptive transients.

Mitigation techniques for radiated EMI propagation are more difficult and expensive, since the radiated noise can be from many different sources proximate to the EMI sensitive circuit or subsystem. Conventional solutions for reducing radiated EMI include protecting sensitive circuit components by shielding. Since radiated EMI has both an electric and magnetic component, two types of shielding are employed. Ground planes and Faraday enclosures have been used for E-field shielding, effectively shunting the electric field and significantly reducing it. For the magnetic H field component, thick ferromagnetic materials with high permeability, such as Mu metal, a nickel-iron alloy, have been used to shunt stray magnetic flux and to keep it from coupling into sensitive conductor traces in nearby circuits.

Although SMPSs can be packaged to fit within the narrow confines of a portable DR detector, integrating these noisy power supplies into the detector housing without introducing interference can be particularly challenging. The need for protection from conducted and radiated EMI that is SMPS-generated can add significantly to the size and weight requirements of an untethered DR detector. Added filter elements for conducted noise compensation increase the overall cost, size, and complexity of the SMPS. Conventional H-field shielding solutions for radiated noise, including Mu metal, are ineffective at the high switching frequencies used. Even if a suitable shielding material could be found, shielding can significantly increase device size and weight.

Thus, there is a need for an improved digital imaging detector that includes an on-board SMPS power supply, but that doesn't suffer from image degradation resulting from EMI.

SUMMARY OF THE INVENTION

It is an object of the present invention to address the need for a switching mode power supply with reduced EMI. With this object in mind, the present invention provides, in one aspect, a digital radiography detector including a two-dimensional array of photosensors arranged in rows and columns, a plurality of signal traces and a switching power supply. The plurality of signal traces are connected to the photosensors- and extend in a first direction along the two-dimensional array. The switching power supply is connected to a power source and includes first and second storage inductors that are substantially matched, are electrically connected in series, include flux fields that are opposite in phase, and are substantially aligned along the first direction of the signal traces.

It is a feature of the present invention that it provides a switching power supply that uses paired inductors disposed to cancel each other's leakage magnetic flux fields.

It is an advantage of the present invention that it provides a switching power supply design that allows compact packaging and that can be used in an electronic device with reduced requirements for emf shielding.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 15 is a timing diagram showing phase shifting of the switching supply to reduce sensitivity to switching transients.

DETAILED DESCRIPTION OF THE INVENTION

It is to be understood that elements not specifically shown or described may take various forms well known to those skilled in the art.

The apparatus and method of the present invention provide a digital radiography (DR) detector with a switching mode power supply (SMPS) that can be advantageous in helping to reduce EMI in nearby circuitry. The SMPS of the present invention is arranged within the DR detector chassis to provide some measure of self-canceling for EMI effects that might otherwise be induced in coupled signal traces of the digital detector.

DR Detector Circuit Architecture

Figure 1:
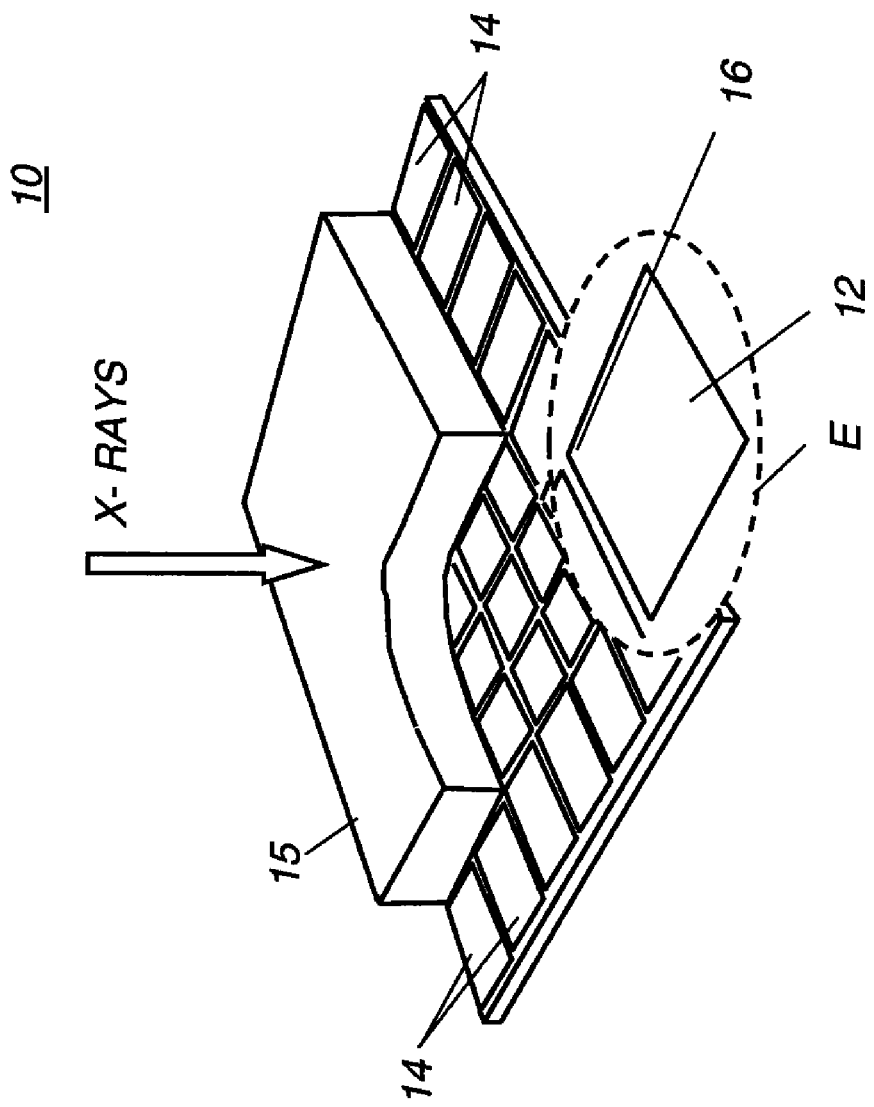
FIG. 1 is a partial cutaway perspective view showing image-sensing components of a conventional DR imaging panel.
Figure 2:
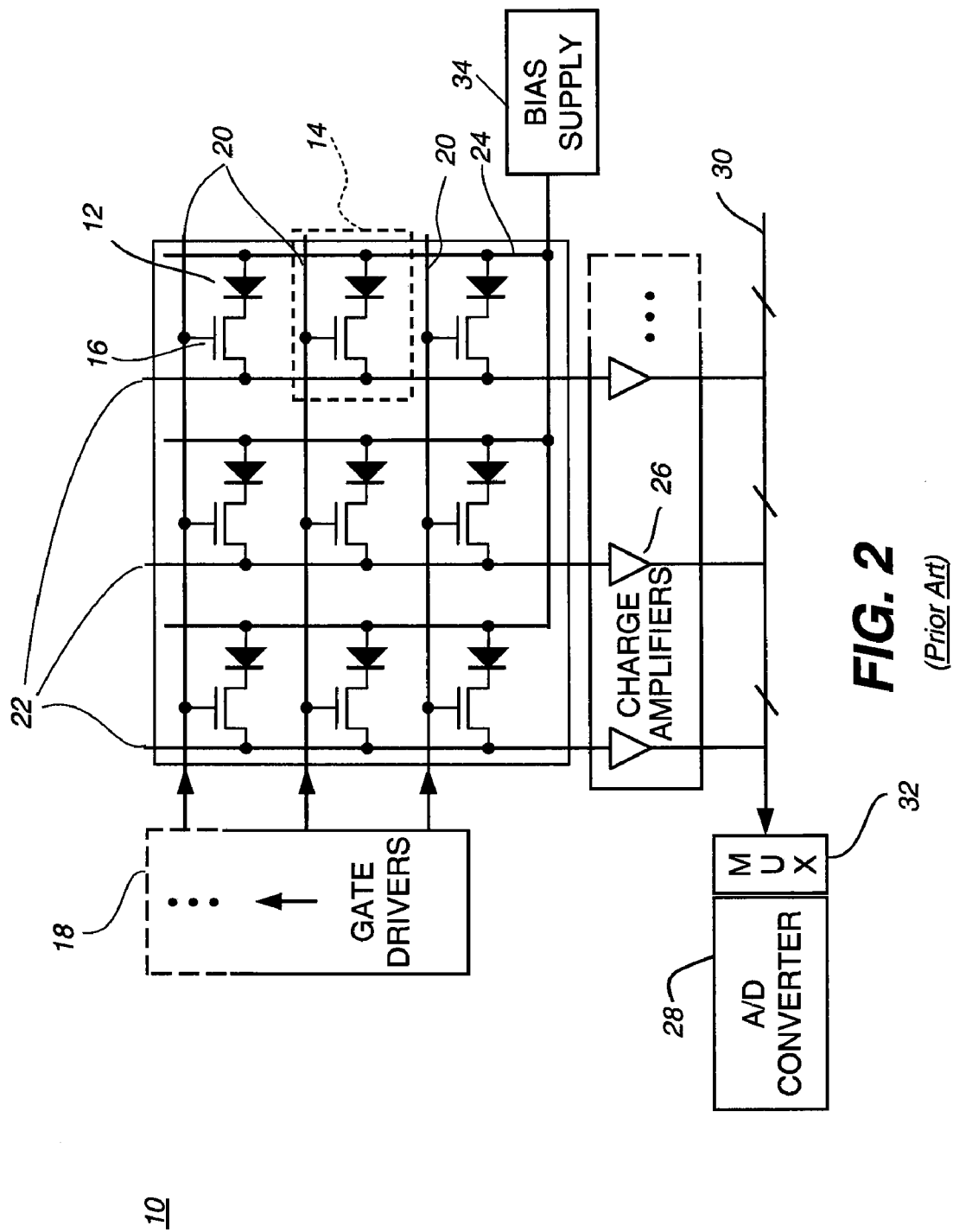
FIG. 2 is a schematic block diagram of a portion of an image sensor array conventionally used in DR radiography.

To appreciate the scale of the problem of using an on-board power supply for the DR detector panel, it is first instructive to take a detailed look at how the detector circuitry is arranged. FIG. 2 shows a schematic of a small section of image sensor array 10 in a conventional DR detector formed as the matrix of pixel sites 14 described in FIG. 1. One pixel site 14 is indicated in dashed outline. Each pixel site 14 includes photosensor 12, such as a photodiode, paired with switch element 16, such as a TFT. Each photosensor 12 can be selectively connected to a column readout trace 22 by its associated switch element 16. In FIG. 2, pixel site 14 has a photodiode as its photosensor 12 and a TFT as its switch element 16; the cathode of the photodiode is then switched through the TFT to the column readout trace 22. The gate of the TFT is controlled on a row line 20 by a corresponding gate driver in a gate driver array 18. The anodes of the photodiodes are connected to a common bias supply 34 by conductive traces 24. When a particular row along one of the row lines 20 is driven, all photodiodes in that row are connected to a corresponding conductive column readout trace through the associated TFT or other switch element 16. Charge from each photodiode is then provided to one of a set of charge amplifiers 26. The charge from each photodiode is proportionate to the amount of light from the DR receiver scintillator screen 15 (FIG. 1) that impinges that particular photodiode. This amount of light is, in turn, directly proportional to the amount of X-ray radiation received at that particular area of the imaging detector. Thus, when all photodiodes in the sensor matrix are taken together a two dimensional analog representation of the X-ray image of the patient is formed.

Each charge amplifier 26 integrates charge from its corresponding photodiode or other photosensor 12 and provides a voltage that is proportional to that charge. This voltage is directed as input to a multiplexer (MUX) 32 of an A/D converter 28 through a signal bus 30. A/D converter 28 converts voltage at the output of each charge amplifier 26 to a corresponding digital value that is then stored in a memory (not shown). Once all pixel sites 14 have been read out using this process, the resulting X-ray image data can be temporarily stored in a local memory unit in the DR detector, for example. At this point, the resulting two dimensional image data can be transmitted from the detector to an external processor or to an operator console for initial evaluation. From there, the image data can be transmitted further downstream for diagnosis and long term archival storage, as required.

Figure 3:
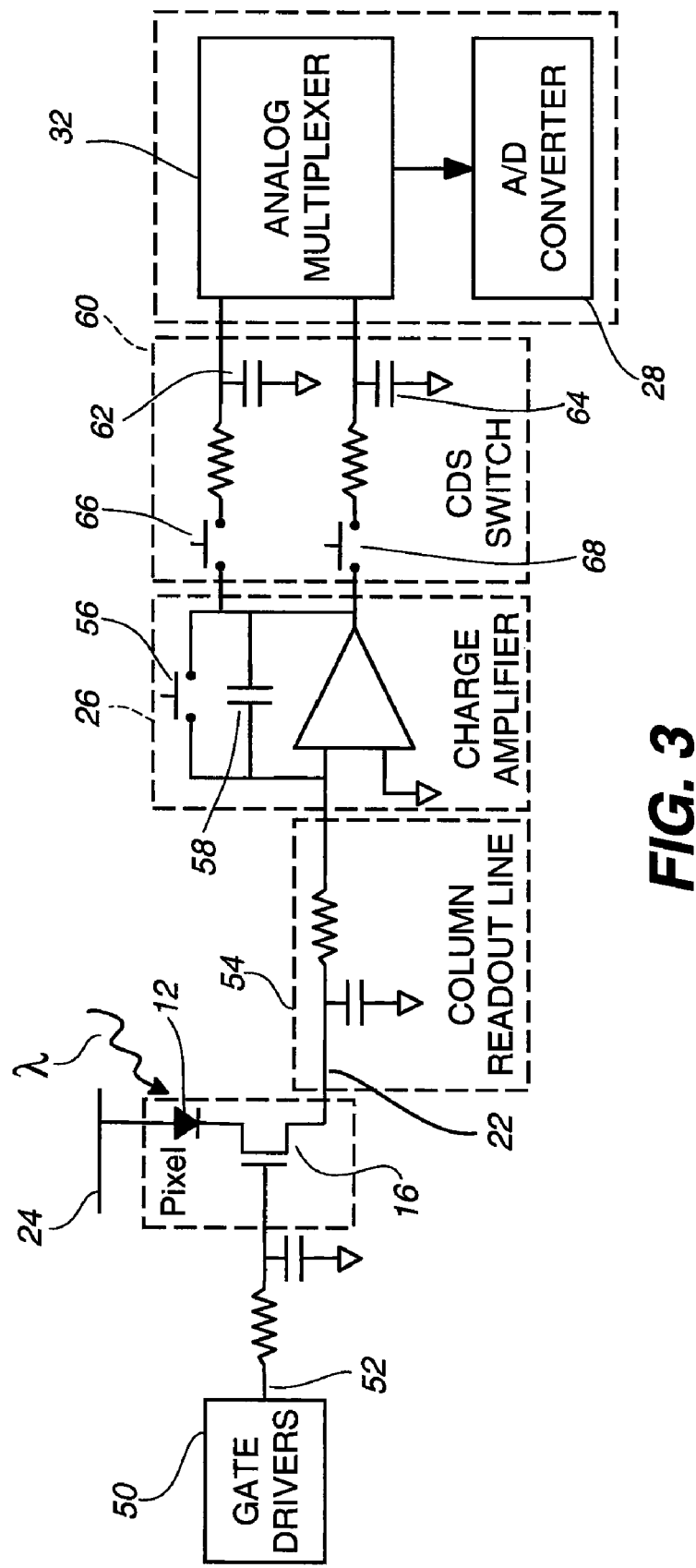
FIG. 3 is a schematic block diagram showing a signal path for signal acquisition from each pixel.

The schematic block diagram of FIG. 3 shows the signal path that applies for image signal acquisition from each pixel, again using the example of a photodiode as photosensor 12 that receives light λ. The cathode of the photodiode connects to the drain of its associated TFT transistor, which serves as switch element 16. The source terminal of the TFT is connected to the input of its associated charge amplifier 26 via column readout trace 22. Each of the column readout conductive traces 22 has an associated distributed capacitance and resistance 54. The gate of the TFT is connected to a gate driver 50 of gate driver array 18 (FIG. 2) via a gate driver line 52. Gate driver line 52 also has a capacitance and resistance distributed along its length. However, due to its low impedance and digital nature, this line is not typically as sensitive to electromagnetic interference as the analog signal lines. Charge amplifier 26 includes an associated switch 56 connected across its integrating capacitor 58. When switch 56 is in a low resistance state (closed) it effectively shorts capacitor 58 and zeros or resets the output of charge amplifier 26. Due to offset voltages inherent in the charge amplifier circuit, the voltage at reset will not be exactly zero. When switch 56 is in a high resistance state (open), charge amplifier 26 integrates charge from the photodiode and converts it to a voltage that is applied to a correlated double-sampling (CDS) circuit 60. The voltage from charge amplifier 26 is directly proportional to the amount of light impinging on the photodiode, which is proportional to the intensity of X-ray radiation at that location, plus some offset error voltage inherent in charge amplifier 26.

CDS circuit 60 samples the output of charge amplifier 26 and directs the sample to MUX 32 under two different conditions. CDS circuit 60 has two sampling capacitors 62, 64, each having a corresponding switch 66, 68. The first sample, sensing the signal offset error, is taken at charge amplifier 26 reset, when switch 56 is closed, shorting integrating capacitor 58. The second sample, containing this same offset plus the pixel signal, is taken after switch 56 has been opened and charge amplifier 26 has accumulated charge across storage capacitor 58 from photosensor 12. Closing switch 68 allows charge storage, providing a voltage signal across capacitor 64. The two voltage signals from CDS circuit 60 are selected by MUX 32, subtracted, and directed to A/D converter 28 where the voltage difference is converted to a digital value. The subtraction removes any offset voltage present in charge amplifier 26 before the integration. The result can then be stored in digital memory (not shown) within the image detector electronics.

The overall circuit architecture and image acquisition signal path shown in FIGS. 2 and 3 shows why the DR detector is highly susceptible to noise. Among some of the more significant noise considerations are the following:

(i) Currents that are generated by the photodiodes in column conductive traces 24 and switched to readout traces 22 are in the micro-amp range, so even slight noise levels can be unfavorable.

(ii) Readout traces 22 have high impedance characteristics. Extending the full length (or width) of image sensor array 10 and connecting to charge amplifiers 26, each one of the thousands of column readout traces 22 can have a length of up to 43 centimeters or more with existing DR panel designs. This combination of high impedance and long lengths makes column readout traces 22 particularly susceptible to extraneous noise interference from time varying magnetic fields in the near vicinity of either pixel sites 14 or radiated near conductive readout traces 22.

(iii) Bias supply 34 traces, such as conductive traces 24, also have high impedance characteristics and are susceptible to stray time-varying magnetic fields.

(iv) Row conductive traces, row lines 20, are also subject to these same time varying magnetic fields. However, the row conductive traces are connected to the gate drivers from gate driver array 18 which is generally a much lower impedance circuit than that of the column conductors. In addition, the row gating signals are thresholded digital signals and are, therefore, orders of magnitude less sensitive to extraneous noise than are signals in the column conductive readout traces 22.

(v) There is further sensitivity to noise in conductive traces of signal bus 30 that direct the output of charge amplifiers 26 to MUX 32 and A/D converter 28, because such are analog signal lines. These can be susceptible to interference from radiated magnetic fields but will tend to have less sensitivity than column readout traces 22 because of the inherent low output impedance of charge amplifiers 26.

(vi) The signal sampling operation and timing needed for switching signals to sampling capacitors 62, 64 make the correlated double sampling operation sensitive to noise during the two sampling operations described above. That is, even though correlated double sampling inherently reduces the effects of induced noise signals, there is still some risk of noise interference during switching transients.

In summary, the standard architecture of these large area high impedance image detectors makes them susceptible to EMI. It is desirable to reduce extraneous noise from the operation of other circuitry that is within the radiological image detector, particularly circuitry that is adjacent to signal lines that route these signals for storage and measurement. Shielding and other measures are taken to reduce EMI from nearby sources as much as possible to lower the noise floor and provide the needed signal-to-noise ratio for diagnostic imaging.

The use of an on-board switching power supply in the DR detector, because of inherently high EMI levels from such a supply as noted earlier, runs directly counter to these requirements. This problem becomes more acute when the requirements for lightweight and compact construction of the DR receiver are taken into account.

Figure 4:
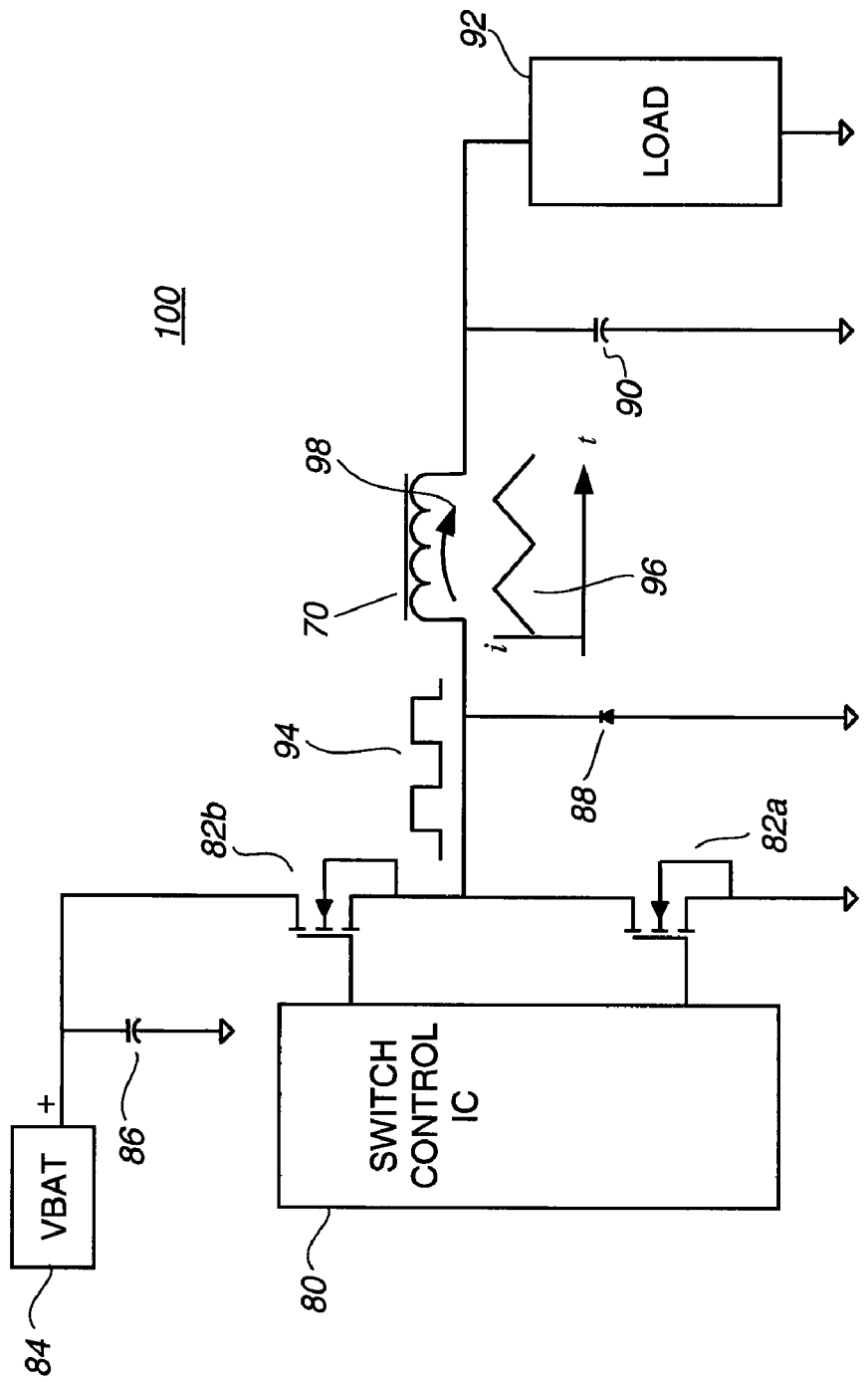
FIG. 4 is a schematic block diagram of a conventional switching mode power supply.

To understand how the apparatus of the present invention addresses these noise problems, it is helpful to describe the overall architecture and operation of the DC-DC switching power supply. The simplified schematic diagram of SMPS 100 in FIG. 4 shows the overall circuit topology commonly employed in these supplies, showing components used in a circuit of this type and some exemplary signal waveforms. Source power is provided by a battery 84, supported by a filter capacitor 86. A switch control circuit 80 alternately switches two solid state switches, shown in FIG. 4 as MOSFET power transistors 82a, 82b, to provide a voltage waveform 94 across a diode 88 and control a current flow 98 in an inductor 70. The current passing through inductor 70 will be a triangle ramp waveform 96 like that shown in FIG. 4. Switching currents present in inductor 70 produce magnetic flux that will vary in magnitude over time (t) at the switching frequency of the power supply. This frequency can range from hundreds of kilohertz to over one megahertz in value with various switching mode designs. The duty cycle ratio of ON to OFF times, as shown in waveform 94, determines or regulates the output voltage at a filter capacitor 90 and a load 92. Switching mode control circuit 80 regulates the voltage present at load 92 by monitoring the voltage on the output of inductor 70 via a feedback line (not shown).

Figure 5B:
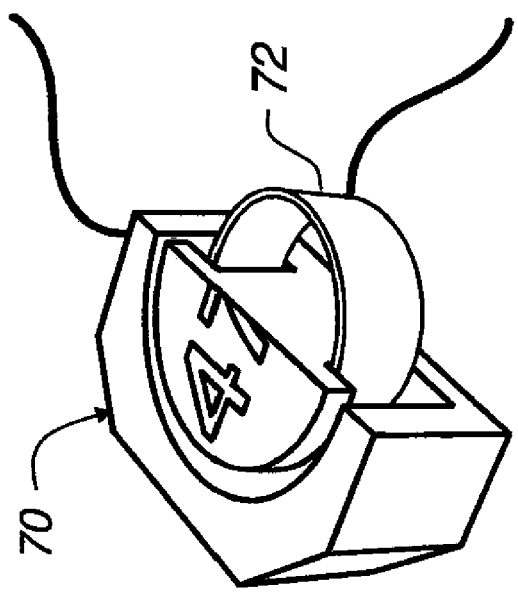
FIG. 5B is a partial cutaway view of the inductor of FIG. 5A.
Figure 5A:
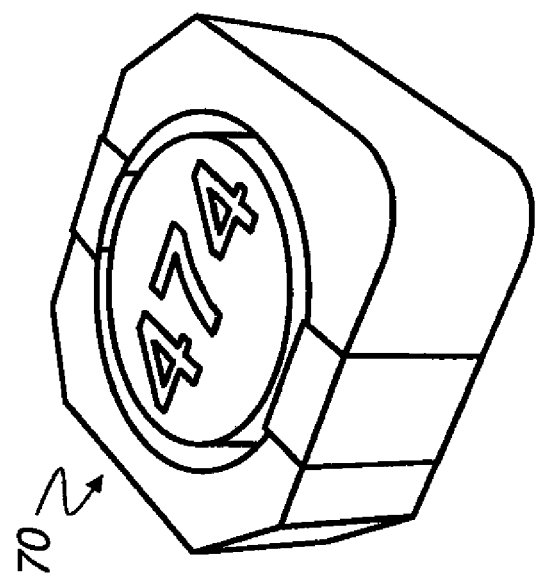
FIG. 5A is a perspective view of a ferrite inductor common to a conventional switching mode power supply.

Typically, the energy storage component used as an energy storage element in SMPS 100 is a ferrite inductor. FIG. 5A shows how inductor 70 is commonly packaged. For use in switching mode power supplies, inductor 70 is usually constructed in such a manner as to reduce the amount of magnetic flux that leaks into the area surrounding the inductor coil. The partial cutaway view of FIG. 5B shows a configuration with an inductor coil 72 wound around a central core of the ferrite material.

Figure 6B:
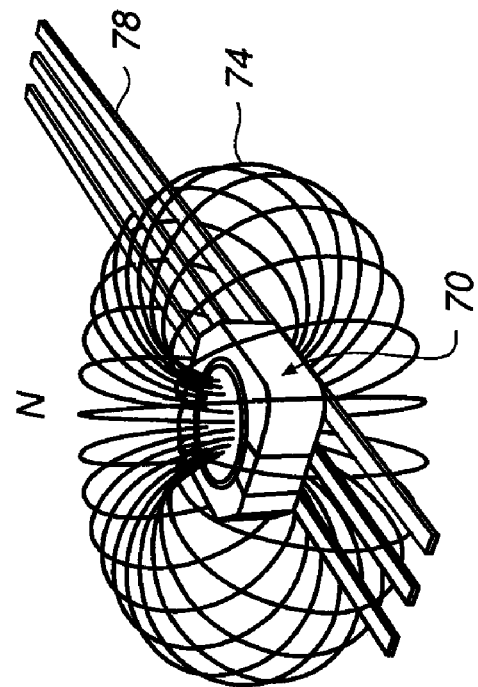
FIG. 6B shows the magnetic field of FIG. 6A as it radiates outward along circuit traces.
Figure 6A:
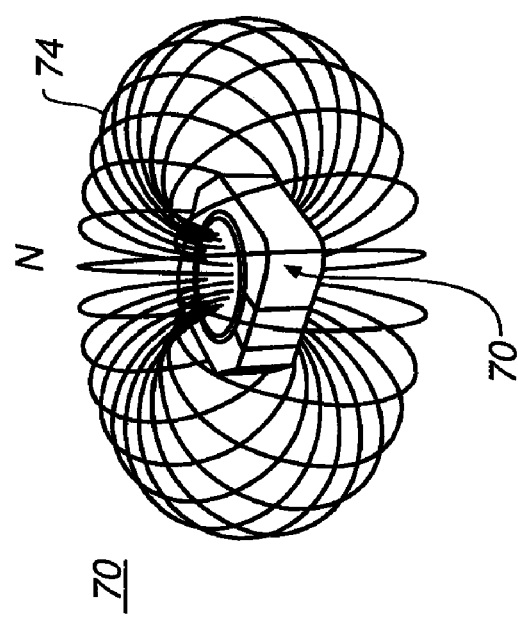
FIG. 6A shows a magnetic field surrounding the inductor of FIG. 5A.

With consideration to design and packaging techniques, inductor 70 radiates a magnetic field that can cause signal interference in nearby circuitry. FIG. 6A shows a generally torroidal magnetic field 74 surrounding inductor 70 due to leakage of the field flux. This type of depiction of magnetic field 74 in FIG. 6A is a coarse approximation, rather than a precise representation, but will serve for the purpose of description in the following discussion.

The direction of magnetic field 74 can be such that either a north pole (designated N) or south pole (S) is formed at the top of the inductor. FIG. 6B illustrates the same inductor 70 and its magnetic field 74 as it radiates outward along conductive traces 78 that extend along a path nearby the inductor. Conductive traces 78, running nearby switching mode power supply inductor 70, cut through or link the lines of the magnetic field 74 of inductor 70. As such, conductive traces 78 are susceptible to induced voltages due to the changing flux of magnetic fields 74 according to Faraday's law of electromagnetic induction, conventionally expressed as follows:

$$\varepsilon = -\frac{d\phi}{dt}$$

where $\varepsilon$ is the induced electromagnetic force (emf) in volts and $\phi$ is the magnetic flux in webers. Conductive traces 78 could be readout traces 22. In such a case, the leakage flux field is likely to add noise to the signal content.

From this equation, it is noted that an induced voltage in the conductor, with a time varying magnetic field, is directly proportional to the time rate of change of the flux linking the conductor. The magnetic flux $\phi$ is proportional to the product of the ampere-turns in coil 72 of inductor 70 times some constant. The specific value of the constant is determined by the particular construction of ferrite inductor 70 and by various parameters related to the specific type of ferrite material and the size of air gaps.

Referring back to FIG. 6B, the rate of change of the current waveform dI/dt in coil 72 creates a d$\phi$/dt or time varying magnetic field 74 due to leakage of the magnetic flux around the inductor 70. This time varying magnetic field induces a corresponding emf voltage in conductive traces 78 that link this magnetic field.

For some types of DC to DC converter topologies, the magnitude of the induced field includes an AC component in addition to a DC component, also termed a DC bias, as is shown in current graph 96 of FIG. 4. The AC component is said to "ride on" the DC bias level. It is the AC component of the magnetic field that is responsible for inducing noise voltages in nearby sensitive conductive circuits.

Thus, as the preceding discussion related to FIGS. 2 through 6B shows, the use of a switching mode power supply in close proximity to conductive signal traces has significant disadvantages. For example, the magnetic flux variation produced by current flowing through the inductor coil produces a corresponding emf voltage that is introduced into conductive traces that lie in the vicinity of the inductor. Further down the signal processing path (as described with reference to FIG. 3), this induced emf voltage is summed with whatever detector signal voltages are present in the column readout conductive traces. The additional emf voltage is a source of noise that can ultimately introduce artifacts into the readout image of the detector.

Conventional approaches for shielding or suppression can be difficult to apply and fall short of what is needed, particularly due to the requirements for compactness and lightweight design. Increasing the distance between inductors and conductive traces is a solution that runs counter to compact design. Likewise, providing sufficient shielding for the conductive signal traces can be impractical. Although some shielding is used, additional shielding adds size and weight; moreover, high switching frequencies prevent the use of many conventional shielding materials.

Figure 7:
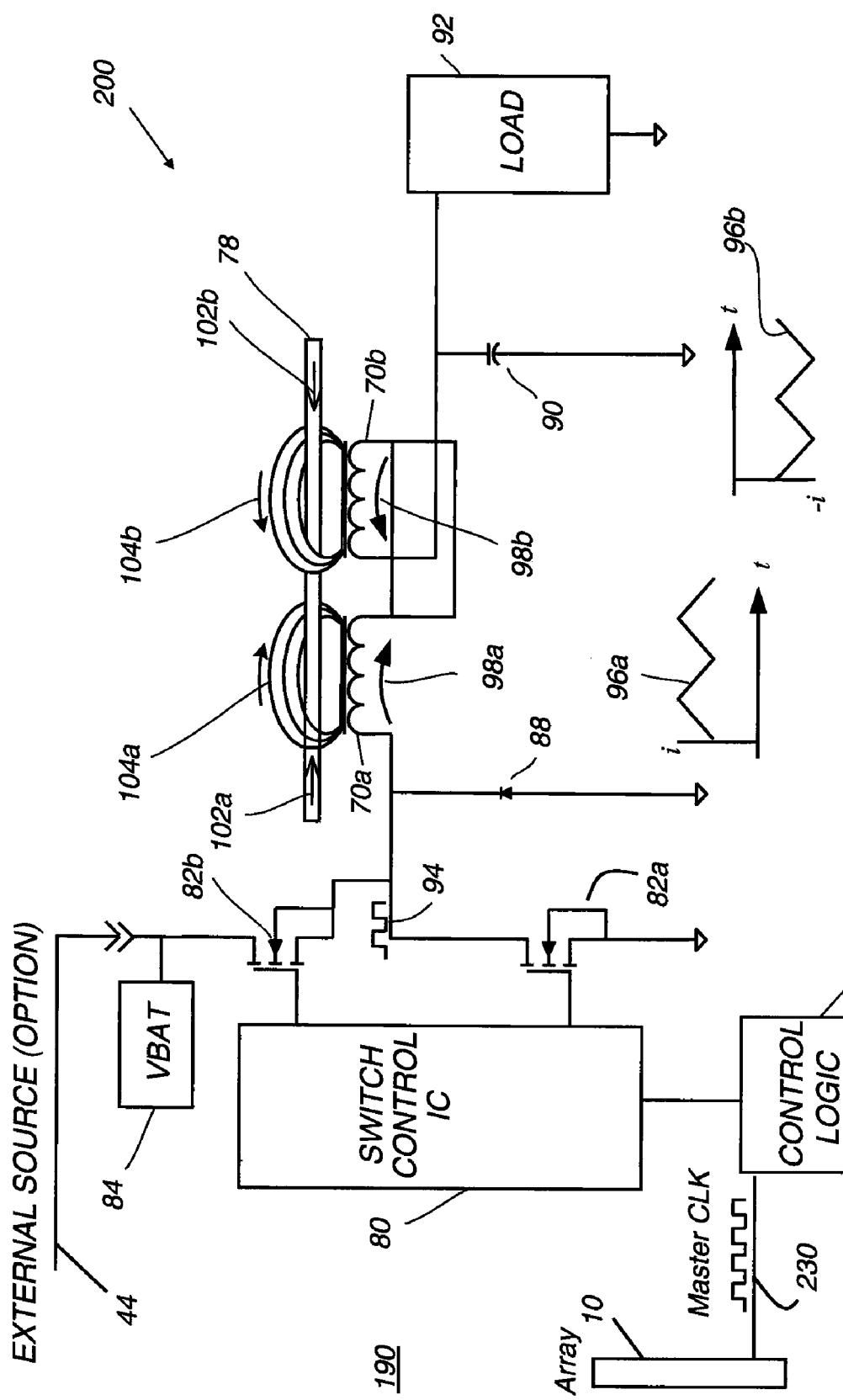
FIG. 7 is a schematic block diagram showing a switching power supply using matching, opposed inductors according to a preferred embodiment of the invention.

Embodiments of the present invention address the problem of induced emf by introducing an opposing emf that cancels at least a portion of the magnetic flux field produced over signal traces in the switching mode supply circuit. The schematic block diagram of a DR detector 190 in FIG. 7 shows a first embodiment of how this can be done in SMPS 200 using a pair of inductors 70a, 70b in series. For this solution, inductors 70a, 70b are substantially matched, that is, have substantially the same inductance, but are configured to provide an opposite phase relationship for the same switched current. The switching mode operation of SMPS 200 follows the same general pattern described earlier with reference to SMPS 100 in FIG. 4 and can be used with an on-board battery 84 or, optionally, with power from an external DC source 44, provided by a tether cable, for example. Switch control circuit 80 drives power transistors 82a, 82b, or other types of switching elements, to direct current through a storage inductance component, here formed using the two inductors 70a, 70b in series. (Load 92 represents the load from the perspective of SMPS 200 functions, since the actual components that are supplied power from this circuit may include at least some portion of array 10 or some of the logic components shown.) A control logic processor 120 coordinates the timing of switching signals from switch control circuit 80 with sampling from image sensor array 10 as controlled by a master clock 230, shown in FIG. 7 and subsequent timing diagrams.

There are, however, significant differences between the FIG. 7 embodiment and conventional switching mode power supply embodiments as were exemplified in FIG. 4. The following are among the more notable differences:

(a) Inductors 70a, 70b are in series, but are connected so that current flow 98a for current switched through inductor 70a is in the opposite direction as current flow 98b through inductor 70b. Inductors 70a, 70b are closely matched, so that each provides one-half of the total inductance needed for the switching supply.

(b) With current flow through inductors 70a, 70b in opposite directions, inductor 70a generates a leakage magnetic flux field 104a that is 180 degrees out of phase with leakage flux field 104b generated from inductor 70b. Magnetic flux fields 104a, 104b are equal in magnitude and opposite in phase. This is also shown in respective waveforms 96a (corresponding to inductor 70a) and 96b (corresponding to inductor 70b). The net effect is that some amount of induced emf is cancelled, particularly along the path of nearby conductive traces 78, one of which is represented as passing through both flux fields 104a, 104b.

Figure 8:
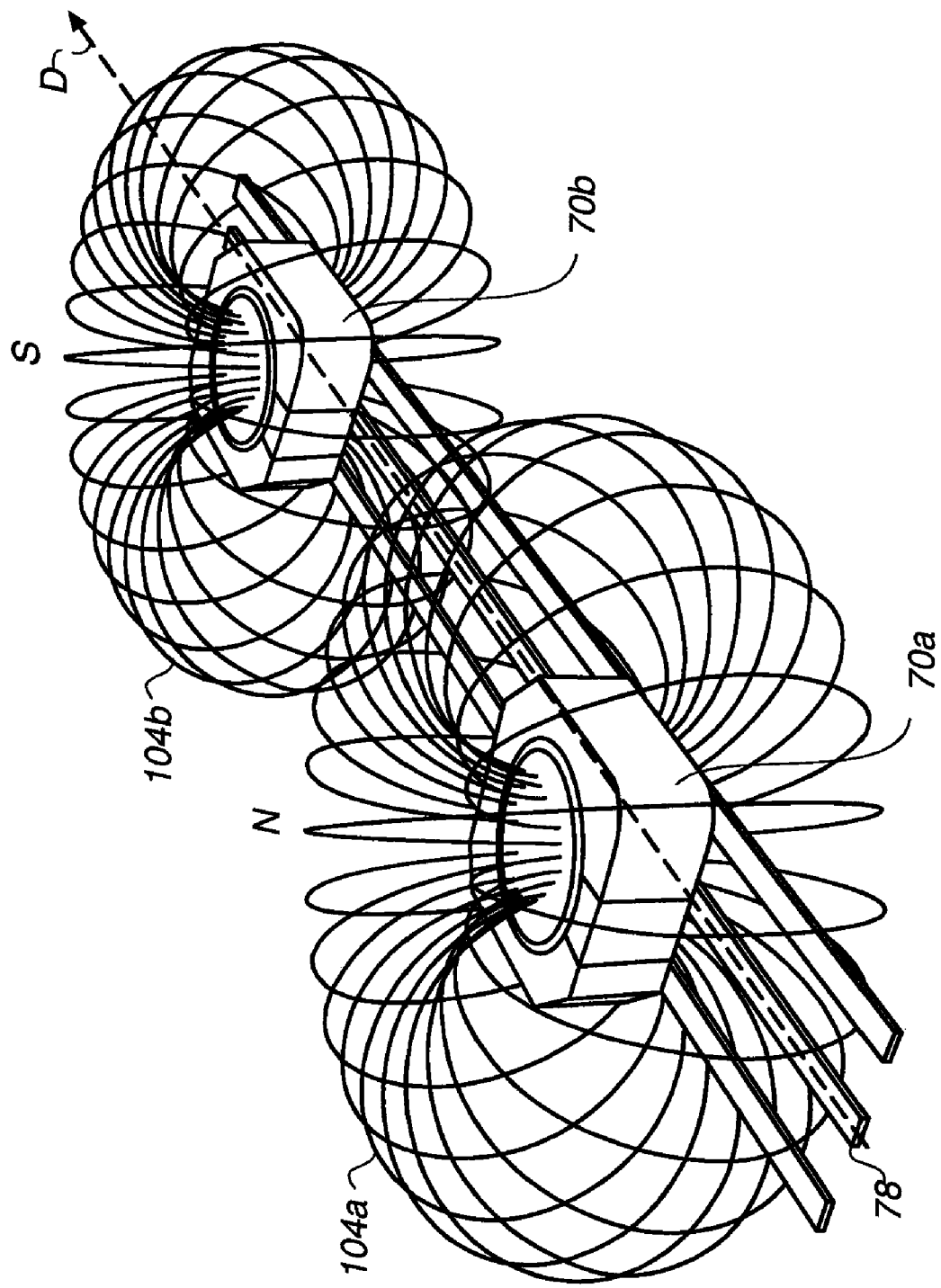
FIG. 8 is a perspective view showing alignment of dual inductors and corresponding magnetic polarity.

(c) Inductors 70a, 70b are arranged in line along the path of conductive traces 78. That is, in order to most effectively cancel the effects of induced emf, the two inductors 70a, 70b should be aligned in the same direction that is followed by the nearest inductively coupled signal line(s), here, traces 78. Referring to the perspective view of FIG. 8, traces 78 extend in a direction D which is also the direction of alignment for inductors 70a, 70b, to provide the most effective emf cancellation for nearby signal traces 78. Here, inductors 70a, 70b are substantially equally coupled to trace 78.

(d) Matched inductors 70a, 70b should be sufficiently close that at least a portion of their magnetic fields overlap. Excessive distance between inductors 70a, 70b would reduce the benefit of this self-canceling effect.

Figure 9:
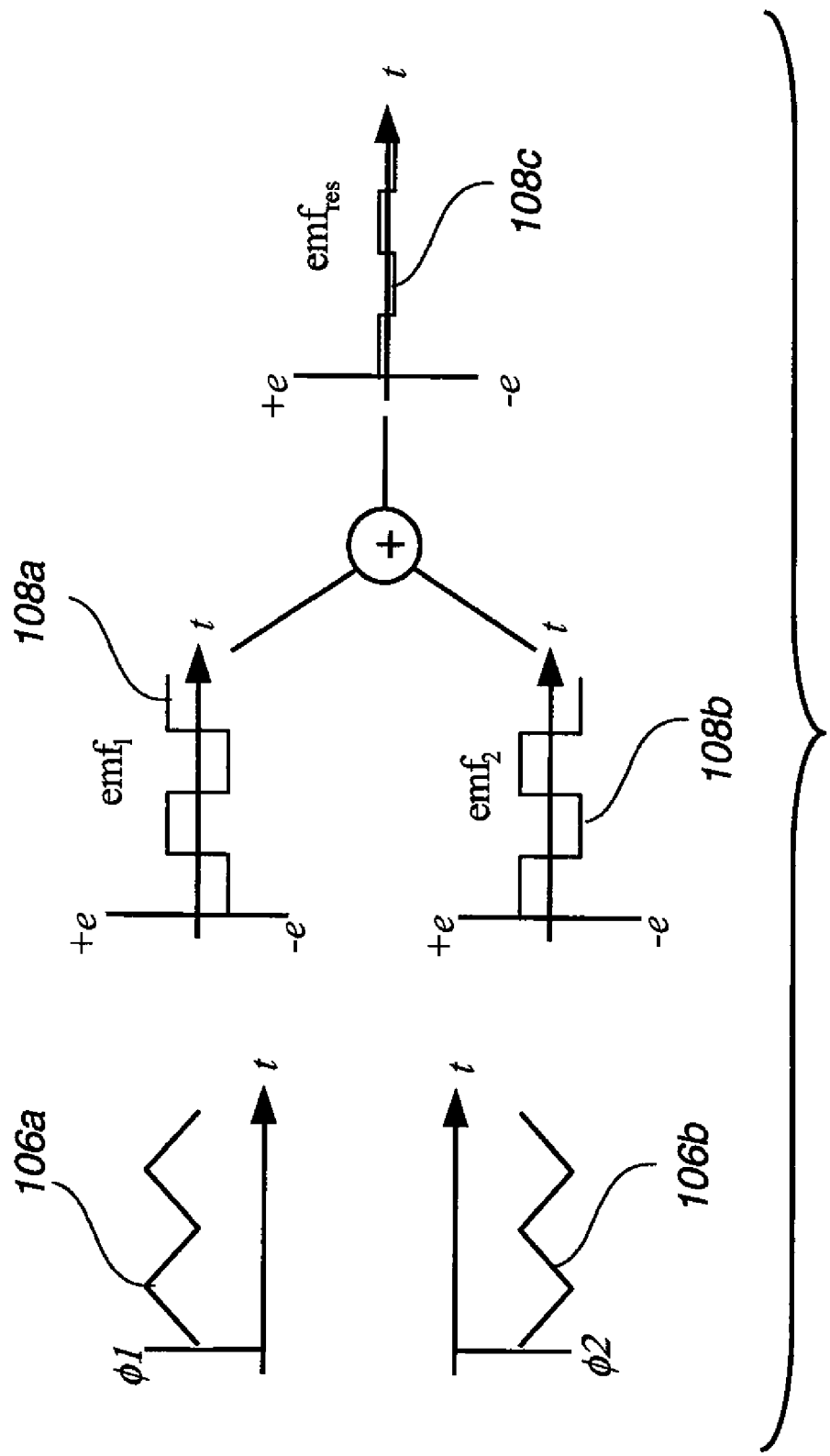
FIG. 9 is a timing waveform diagram that shows the self-canceling effect of opposed EMF signals.

The timing waveforms in FIG. 9 show the separate phase ($\phi_1, \phi_2$) and emf ($emf_1$, $emf_2$) signals that are combined to provide the resultant emf signal ($emf_{res}$) for emf compensation. Waveforms 106a, 106b show the changing flux field for respective inductors 70a, 70b. Emf waveforms 108a, 108b show the induced emf signals that result from this changing flux and that is coupled to conductive signal trace 78 for inductors 70a, 70b, respectively. Either of the induced emf voltages is a source of noise error when induced in conductive trace 78, an error that could easily result in image artifacts in a radiological image detector, but when both induced emf voltages are simultaneously present, in the same vicinity, and aligned along the same signal trace, the net sum provides the needed cancellation, leaving only a residual $emf_{res}$ waveform signal 108c which is much smaller than either of the emf 108a or emf 108b waveforms alone.

Figure 10:
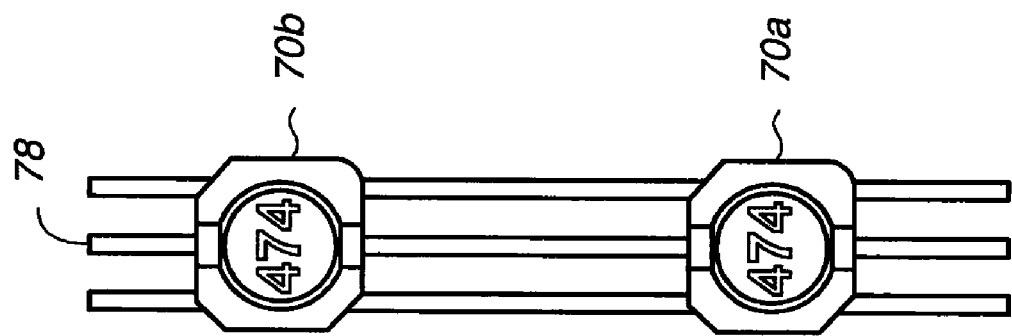
FIG. 10 is a plan view showing alignment of dual inductors relative to signal traces.

The plan view of FIG. 10 is a top view showing accurate alignment of two inductors 70a, 70b over conductive traces 78. Three conductive traces 78 are shown. It should be observed that, in an actual image detector apparatus, there can be hundreds of conductive traces that extend beneath or extend nearby each inductor. It is preferable, therefore, to have each inductor of the inductor pair lying equally near the exact same set of traces, that is, aligned in the predominant direction followed by the signal traces of the digital imaging detector.

A single inductor pair 70a, 70b, as described with reference to FIGS. 7-10 serves each switching mode power supply. It should be noted that a complex apparatus such as a radiological image detector may require a number of different voltages in order to provide power over the range needed for various logic, processing, and sensing circuits. Therefore, there can be a number of switching mode supplies on a single DR detector, each supply having its own pair of inductors. Where this is the case, it can be preferred to space inductor pairs so that they are staggered apart from each other at a suitable distance in order not to interfere with the field cancellation effect of nearby inductor pairs. An example of possible inductor pair placement is shown in the top view of FIG.

11. Here, two inductor pairs 110*a*, 110*b* are shown. To achieve suitable performance, the first and second inductor pairs 110*a*, 110*b* are positioned so that they do not lie over the same conductive traces 78. The objective is, where possible, to prevent having two residual error voltages from two or more inductor pairs coupled to the same set of conductive traces, since this would double the resulting error voltages on the conductive traces and could increase image artifacts caused by the larger residual error voltage.

Figure 12:
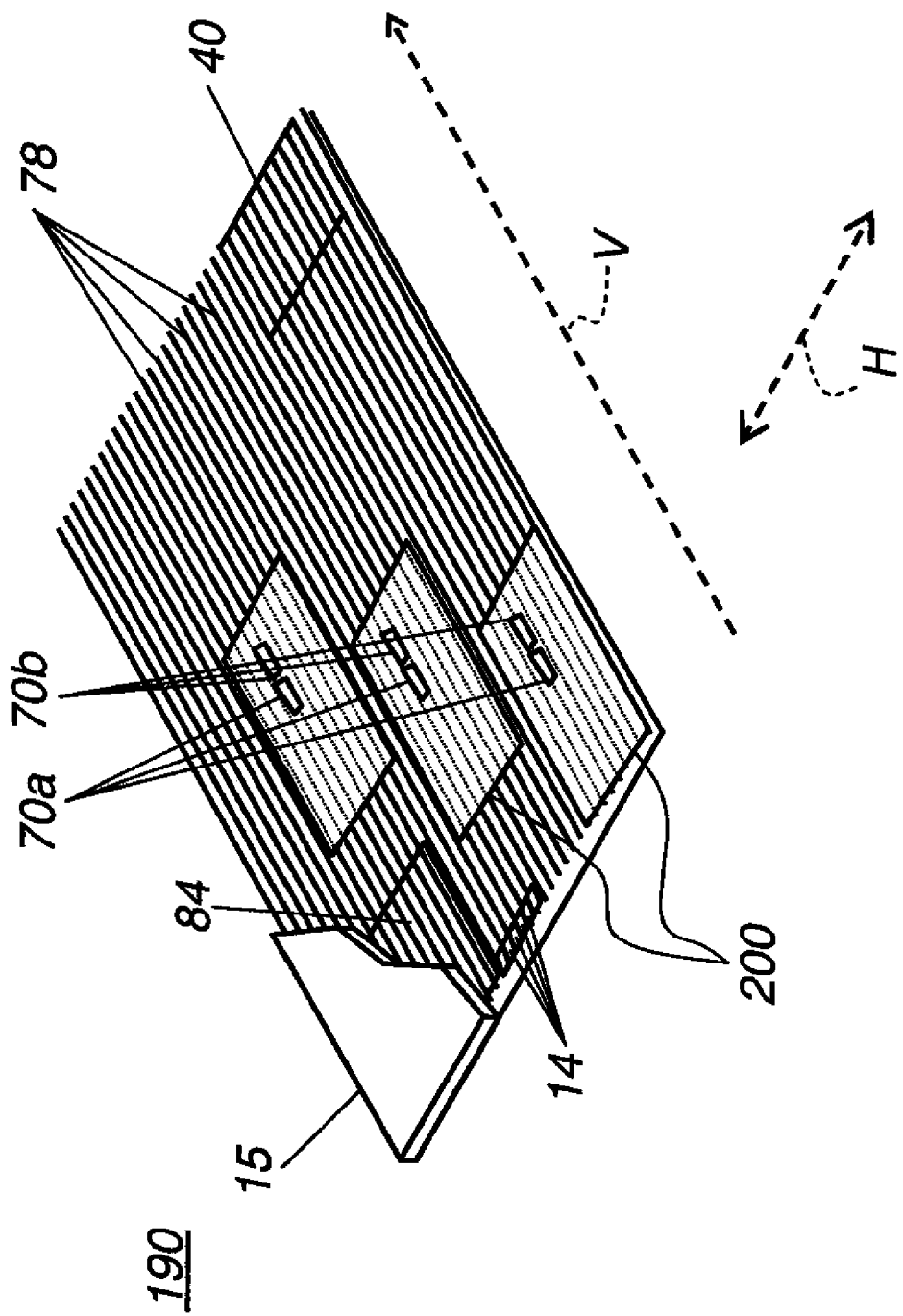
FIG. 12 is a perspective cutaway view of a DR detector according to an embodiment of the invention.

FIG. 12 shows an embodiment of a portable DR detector 190. Here, a series of conductive signal traces 78 extend the length of DR detector 190 in a direction V (a vertical direction as DR detector 190 is conventionally positioned). Orthogonal to this vertical direction V is a horizontal direction H. The full sensing surface of DR detector 190 has a two-dimensional array of pixel sites 14; a few pixel sites 14 are shown in the representative view of FIG. 12, not to scale. A wireless interface 40 is also provided, so that DR detector 190 is a fully portable imaging panel.

Figure 11:
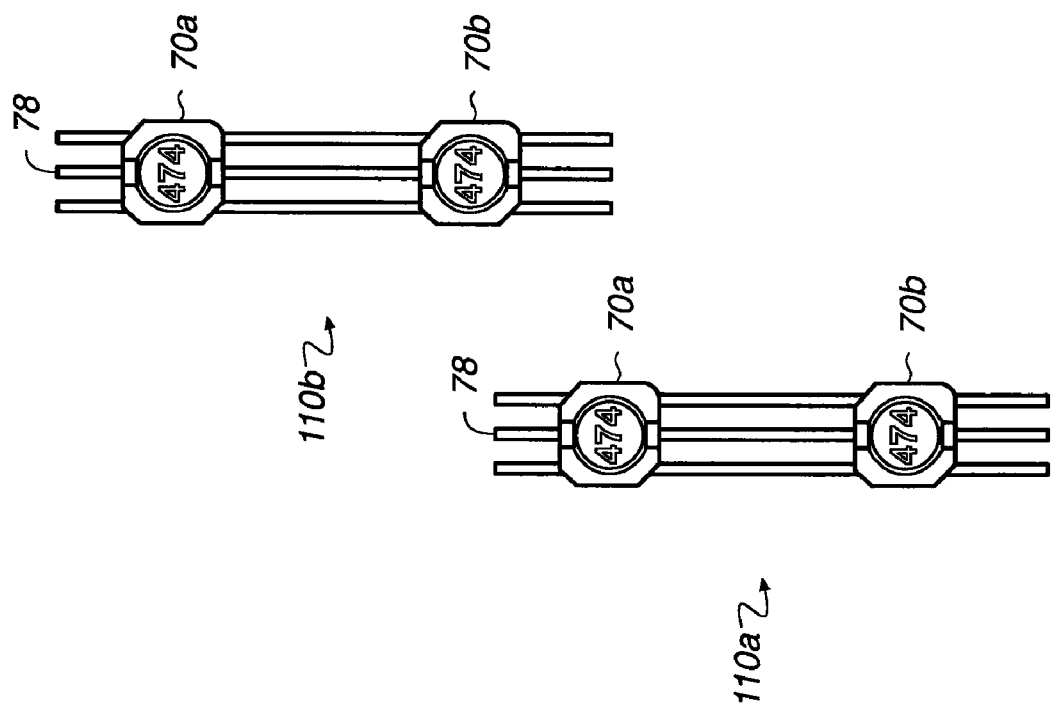
FIG. 11 is a plan view showing alignment of dual inductors in pairs, one pair for each switching power supply.

In a self-contained embodiment, DR detector 190 has at least one on-board battery 84 that provides a power source. This embodiment uses multiple switching power supplies 200, each with dual aligned inductors 70*a*, 70*b* arranged in line, extended in the V direction, and aligned along nearby signal traces 78. Notably, inductors 70*a*, 70*b* for the different power supplies 200 are not aligned along the H direction that is orthogonal to the main trace direction V. Instead, as was described earlier with reference to FIG. 11, each pair of inductors 70*a*, 70*b* is staggered from its neighboring pair, so that the pairs do not align with each other. This helps to minimize any possible cross-coupling that might otherwise occur between adjacent paired inductors where multiple power supplies 200 are used.

As was shown in FIG. 9, there is still some amount of residual induced noise, emf$_{res}$ 108*c* in traces that lie nearby both inductors 70*a*, 70*b*. Even with reduced noise, there can be some image acquisition operations that are particularly sensitive to switching transients. To help mitigate the effects of power supply switching transients on signal sensing circuitry, the timing of power supply switching can be adjusted to shift its phase relative to signal acquisition timing.

Figure 13:
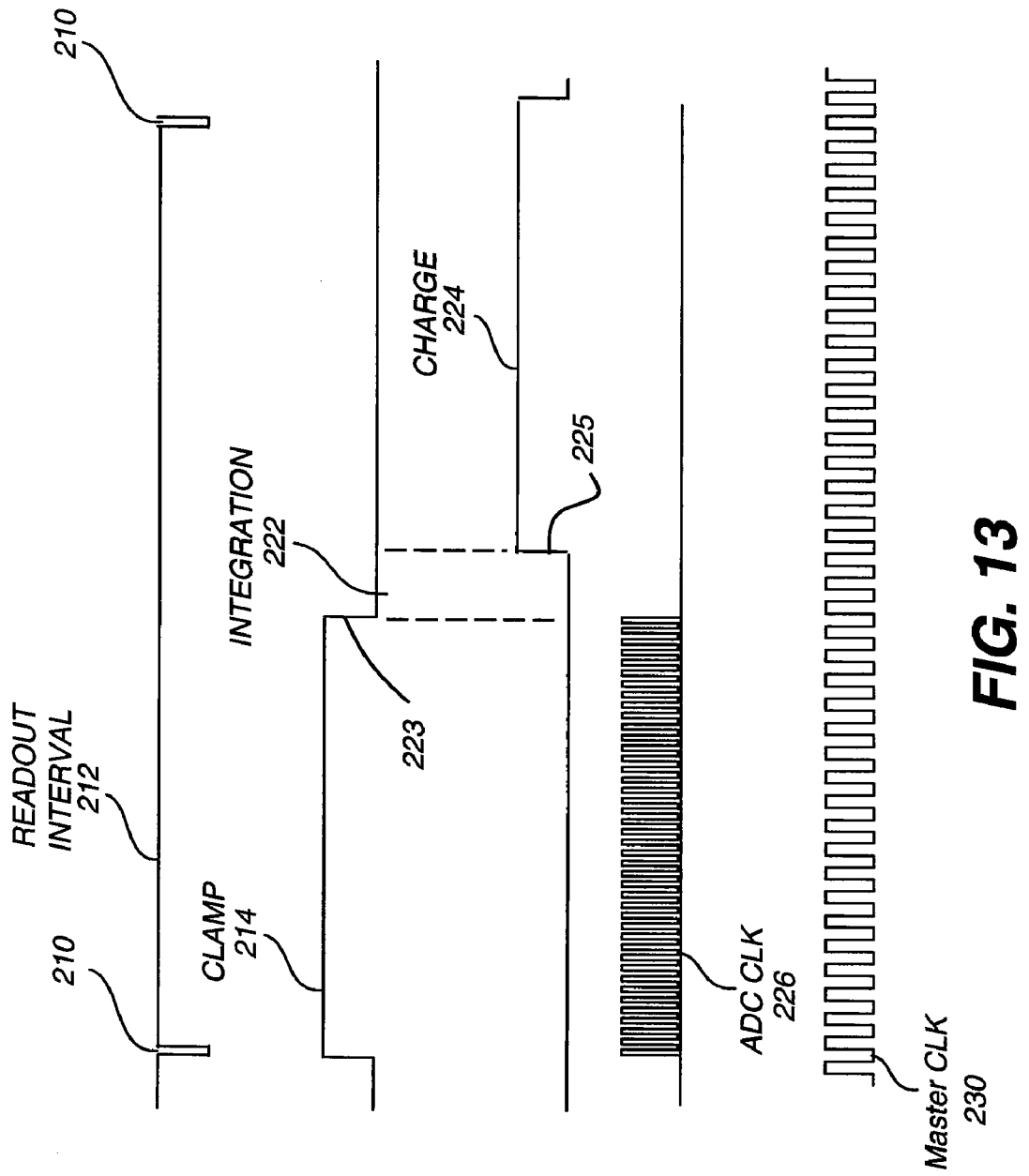
FIG. 13 is a timing diagram showing the relationship of control signals for image signal acquisition for each row of pixels.

The timing diagram of FIG. 13 shows waveforms associated with correlated double-sampling image acquisition for each row of pixels. Component references are to the block diagram of FIG. 3. Pulses 210 define a readout interval 212 over which all columns of a single row are read. A clamp pulse 214 occurs during the time that switch 66 is closed and sampling capacitor 62 charges. After an integration interval 222, a charge pulse 224 occurs and sampling capacitor 64 charges, storing the integrated signal from the charge amplifier. An ADC clock 226 is used for A/D converter 28 timing. Clock 226 is synchronized with a master clock 230 (FIG. 7). The waveforms of FIG. 13 represent how one photodiode site would operate. It should be appreciated however, that the operation illustrated in FIG. 13 occurs simultaneously for all photodiode sites in the given row during its readout operation.

Figure 14:
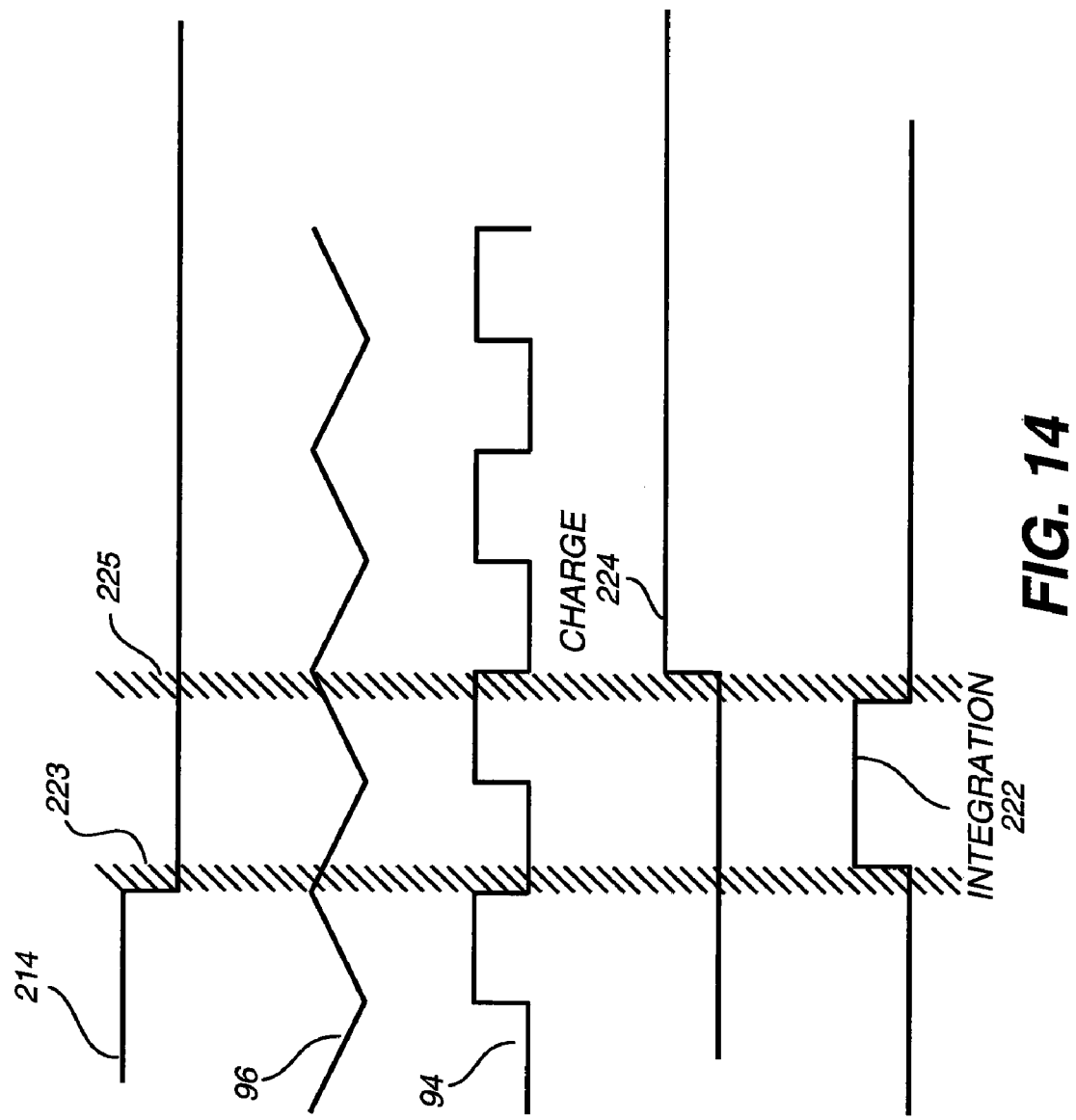
FIG. 14 is a timing diagram showing possible sensitivity to switching transients without slight phase shifting.

FIGS. 14 and 15 look more closely at the timing of integration interval 222 of FIG. 13 and show how phase shifting works relative to power supply timing and current waveforms 94, 96. FIG. 14 shows conventional timing, without the use of phase shifting. Transitions 223, 225 denote the finite integration time during which capacitor 58 (FIG. 3) charges to the signal level for a pixel. Transitions 223, 225 indicate two instants of time during which the signal acquisition process can be particularly susceptible to switching transients. Waveforms 96, 94 show the inductor current and switching clock, respectively, for power supply 200. FIG. 14 shows an arrangement in which the switching times of power supply 200 coincide with transitions 223, 225. With this timing, induced noise signals can tend to produce artifacts in the image data.

A slight timing adjustment helps to compensate for this difficulty. FIG. 15 shows the result of phase adjustment and its advantages in a preferred embodiment. Here, switching waveform 94 is offset from the sampling transitions, its switching signals shifted just enough to move its transitions past transitions 223, 225. With reference to the schematic diagram of FIG. 7, a timing phase adjustment can be provided by operator command entry to control logic processor 120.

The optimum positional phase location can be determined operationally by examining image data from the radiological image detector at the time of manufacture. The clocks of all switching mode power supplies used in the radiological image detector are synchronized to master clock 230 which controls and synchronizes the row readout circuitry. However, the positional phase relationship of each switching mode power supply can be individually adjusted to a unique phase offset position. This feature, along with the ability to programably adjust the phase position, provides a high degree of flexibility to tailor the operation of each switching mode power supply in a radiological image detector in order to minimize objectionable image artifacts.

The method of the present invention helps to reduce the effects of noise within the radiological detector from switching power supplies, particularly noise due to magnetic field fluctuation when switched inductors are used as energy storage components. By using two inductors in series, positionally aligned with column readout traces and connected with opposite polarity so that the switched current flows in opposite directions in each inductor at any one time, the apparatus and method of the present invention provide opposing electromagnetic fields to cancel each other along the path of nearby signal traces. Using the method and apparatus of the present invention, the effects of induced emf from switched inductors can be minimized, reducing the shielding requirements. Signal traces and some image acquisition components of the radiological image detector can be placed or routed near the power supply components.

The apparatus and method of the present invention provides a DR detector panel that can be portable, not requiring any type of tether or cable connection in order to operate. Wireless interface 40 (FIG. 12) can use any of a number of different wireless protocols and mechanisms, including IEEE 802.11g or IEEE 802.11n and other interface tools. Battery 84 can be rechargeable, such as a Lithium ion battery or other source, enabling the DR detector to be used for a number of hours before requiring recharge or battery replacement. Optionally, as was described with reference to FIG. 7, power can be provided from an external DC source 44, such as using a tethered cable. In yet other embodiments, an option is available for using either a tethered cable connection or an untethered arrangement, disconnected from the tethered cable in order to run on battery power. The tethered or un-tethered configuration is selectable to suit the power requirements of obtaining a particular type of radiographic image. A tethered cable solution also allows for transmission of data signals as well as power, eliminating the need for, or supplementing, wireless communication. For example, a standard USB or ethernet data connection could be provided along with DC power in a tethered cable solution.

As was described with reference to FIGS. 7 and 13-15, embodiments of the present invention allow various options for control of switching supply timing relative to the timing of data acquisition functions. This control can be programmed, dynamically adjusted, or operator-controlled or adjusted. For example, as was discussed with respect to FIG. 15, a calibration sequence might be used to adjust timing offsets to obtain the lowest measurable noise level. Calibration adjustments can be made manually or by means of software instructions, using mechanisms well known to those skilled in the electronic arts.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, a different inductor packaging arrangement could be used than the configuration shown in FIGS. 5A-6B. Although the present description focuses on design and use of a switching power supply in a DR detector, the apparatus of the present invention could be readily used with other types of signal sensing or processing devices that employ an on-board switching power supply. The switching power supply itself can be any of a number of suitable types, including buck, boost, flyback, push-pull, Cuk, and others.

Thus, what is provided is an apparatus and method for a switching power supply configured for a digital imaging detector or other sensitive electronic apparatus.

| PARTS LIST | |
|---|---|
| 10. | Image sensor array |
| 12. | Photosensor |
| 14. | Pixel site |
| 15. | Scintillator screen |
| 16. | Switch element |
| 18. | Gate driver array |
| 20. | Row line |
| 22. | Readout trace |
| 24. | Trace |
| 26. | Amplifier |
| 28. | A/D converter |
| 30. | Bus |
| 32. | Multiplexer |
| 34. | Bias supply |
| 40. | Wireless interface |
| 44. | DC source |
| 50. | Gate driver |
| 52. | Driver line |
| 54. | Distributed capacitance and resistance |
| 56. | Switch |
| 58. | Capacitor |
| 60. | CDS circuit |
| 62, 64. | Capacitor |
| 66, 68. | Switch |
| 70, 70a, 70b. | Inductor |
| 72. | Coil |
| 74. | Magnetic field |
| 78. | Traces |
| 80. | Switch control circuit |
| 82a, 82b. | Power transistors |
| 84. | Battery |
| 86. | Capacitor |
| 88. | Diode |
| 90. | Capacitor |
| 92. | Load |
| 94, 96, 96a, 96b. | Waveform |
| 98, 98a, 98b. | Current flow |
| 100. | Power supply |
| 102a, 102b. | Current flow |
| 104a, 104b. | Flux field |
| 106a, 106b. | Waveform |
| 108a, 108b, 108c. | Waveform |
| 110a, 110b. | Inductor pair |
| 120. | Control logic processor |
| 190. | DR detector |
| 200. | Power supply |
| 210. | Pulse |

| -continued | |
|---|---|
| PARTS LIST | |
| 212. | Interval |
| 214. | Pulse |
| 222. | Interval |
| 223, 225. | Transition |
| 224. | Pulse |
| 226. | Clock |
| 230. | Waveform, master clock |
| E. | Enlarged section |
| H. | Horizontal |
| V. | Vertical |

The invention claimed is:

1. A digital radiography detector comprising:
a two-dimensional array of photosensors disposed in rows and columns;
a plurality of signal traces connected to the photosensors and extending in a first direction along the two-dimensional array; and
a switching power supply connected to a power source and comprising first and second storage inductors, wherein the first and second storage inductors are substantially matched, are electrically connected in series, include flux fields that are opposite in phase, and are substantially aligned along the first direction of the signal traces.

2. The digital radiography detector of claim 1 further comprising a second switching power supply connected to the power source and comprising third and fourth storage inductors, wherein the third and fourth storage inductors are substantially matched, are electrically connected in series, include flux fields that are opposite in phase, and are aligned substantially along the first direction of the signal traces.

3. The digital radiography detector of claim 2, wherein the first and second storage inductors are staggered from the third and fourth storage inductors.

4. The digital radiography detector of claim 2, wherein the first and second storage inductors are sufficiently spaced from the third and fourth storage inductors that the magnetic fields of the first and second storage inductors do not interfere with the magnetic fields of the third and fourth storage inductors.

5. The digital radiography detector of claim 2, wherein the first and second storage inductors lie over a first portion of the plurality of signal traces, and the third and fourth storage inductors lie over a second portion of the plurality of signal traces.

6. The digital radiography detector of claim 1 wherein the power source is a rechargeable battery disposed on the digital radiography detector.

7. The digital radiography detector of claim 1 wherein the power source is tethered to the detector using a cable.

8. The digital radiography detector of claim 7 wherein the cable further communicates data signals between the digital radiography detector and an external source.

9. The digital radiography detector of claim 1 further comprising a wireless data interface.

10. The digital radiography detector of claim 1 further comprising a processor configurable to provide an adjustable timing offset between switching power supply drive signals and the timing of sampling signals for the array of photosensors.

11. The digital radiography detector of claim 1 wherein the switching power supply is one of a buck, boost, flyback, Cuk, or push-pull type power supply.

12. The digital radiography detector of claim 1 wherein the switching supply is synchronized to a master clock for readout circuitry.

13. A method of providing power to a digital radiographic detector having a two-dimensional array of photosensors disposed in rows and columns and a plurality of signal traces connected to the photosensors and extending in a first direction along the two-dimensional array, the method comprising:

provide a DC power source;

connecting a switching power supply to the power source, the switching power supply comprising first and second storage inductors that are substantially matched, are electrically connected in series, include flux fields that are opposite in phase, and are substantially aligned along a direction that is parallel to the plurality of signal traces of the digital radiographic detector; and offsetting switching transitions of the switching power supply and signal transitions of sampling control signals for sensing devices of the detector.

14. The method of claim 13 wherein the DC power source is a battery disposed on the radiographic detector.

15. The method of claim 10 further comprising adjusting the offset.

* * * * *